United States Patent [19]
DeMerritt et al.

[11] Patent Number: 5,261,928
[45] Date of Patent: Nov. 16, 1993

[54] GREENHOUSE HEATING SYSTEM

[75] Inventors: Paul A. DeMerritt, Rochester Hills, Mich.; Don J. Amo, San Andreas, Calif.

[73] Assignee: Combustion Research Corporation, Rochester Hills, Mich.

[21] Appl. No.: 4,692

[22] Filed: Jan. 14, 1993

Related U.S. Application Data

[62] Division of Ser. No. 713,435, Jun. 10, 1991, Pat. No. 5,188,288.

[51] Int. Cl.$^5$ .......................... A01G 9/24; F24D 5/08; F24D 19/02; F24H 3/02
[52] U.S. Cl. .......................................... 47/58; 47/17; 126/91 A; 237/69
[58] Field of Search ...................... 237/70, 69; 47/17 I, 47/17 EC, 17 R, 58; 126/91 A

[56] References Cited

U.S. PATENT DOCUMENTS

| | | | |
|---|---|---|---|
| 3,833,054 | 9/1974 | Gross et al. | 237/70 X |
| 4,196,544 | 4/1980 | Davis et al. | 47/17 R |
| 4,290,242 | 9/1981 | Gregory et al. | 47/17 I |
| 4,301,626 | 11/1981 | Davis et al. | 47/17 I |
| 4,699,316 | 10/1987 | Johnson | 47/17 EC |

Primary Examiner—Arnold Rosenthal
Attorney, Agent, or Firm—Krass & Young

[57] ABSTRACT

A radiant heating system for a greenhouse utilizing radiator tubing formed from substantially gas impermeable plastic material. The system includes a radiator tube disposed overhead and formed from light transmitting material so that sunlight projecting into the greenhouse will be substantially transmitted to the plants grown thereunder and a second radiator tube disposed proximate the greenhouse floor and formed of similar plastic material. The radiated tubes are interconnected at one of their ends and a burner communicates through a manifold connected to the other ends of the radiator tubes to transmit a heated effluent through the tubes. Valve means and exhaust means are associated with the manifold. The valve means operates to selectively direct the heated effluent from the burner to the overhead radiator tube for subsequent movement through the inner connection and the floor radiator and back to the manifold for discharge from the greenhouse through the exhaust means, or to direct the heated effluent from the burner to the floor radiator tube for subsequent movement through the inner connection and the overhead radiator and back to the manifold for discharge from the greenhouse through the exhaust means. This allows for a primary heating radiator and a secondary or residual radiator in the greenhouse.

10 Claims, 3 Drawing Sheets

GREENHOUSE HEATING SYSTEM

This application is a division of application Ser. No. 07/713,435, filed Jun. 10, 1991 now U.S. Pat. No. 5,188,288.

FIELD OF THE INVENTION

This invention relates to heating systems and, more particularly, to radiant tube heating systems for greenhouses.

BACKGROUND OF THE INVENTION

In order to grow plants in greenhouses, a proper combination of light, heat, and humidity must be maintained. This combination of light, heat, and humidity should be consistent throughout the greenhouse so that plants grow uniformly regardless of position therein. At times, the requisite light and heat are provided naturally from the sun, which projects radiant energy through the elevated window areas of the greenhouse. However, it is often too cold during the winter to grow plants without some source of additional heat, especially in northern climates.

Heat may be provided by forced air heaters which distribute heated air directly into the greenhouse. However, this arrangement is not entirely satisfactory for many reasons. A forced air system unevenly distributes heated air initially in the greenhouse, and tends to concentrate the heat in the areas around the heated air outlets. Further, much of the hot air is lost through the roof and walls of the greenhouse before being dispersed throughout the greenhouse. As a result, during the winter days, the temperature in many areas of the greenhouse can be as low as 50 degrees which results in improper plant development.

Insulating materials have been used on the roof and walls of the greenhouse to address the previously mentioned heat loss problems associated with direct air heating. A system of this type is disclosed in U.S. Pat. Nos. 4,064,648 to Cary, and 4,313,650 to Ward et al. Such systems typically provide for reflective insulating panels which, at times, may block direct sunlight from entering the greenhouse and produce unwanted shadows therein. Such systems are also unsatisfactory since the plants need uniform heat and light for proper growth.

Radiant heating systems have been used to heat greenhouses. Radiant systems provide an indirect source of heat and are generally capable of having heating elements which can be more precisely positioned within a greenhouse. Radiant heating systems typically employ metallic energy-emitting tubular conduits mounted overhead in an area to be heated. Such systems further include a burner which fires a heated effluent into the conduit, an opaque reflector mounted over the conduit, and an exhaust system to expel the effluent and products of combustion outside the greenhouse. One such radiant heater system is disclosed in U.S. Pat. No. 3,399,833 to Johnson.

A characteristic of these radiant heating systems is the wide variance in the amount of thermal energy emitted from the conduit over its working length. While the temperature inside the metallic conduit immediately adjacent the burner may reach levels in excess of 1600° F., the temperature inside the conduit at the exhaust end, depending on length, may be as low as 200° F. This results in an uneven emission of thermal energy over the length of the conduit. Unless the spacing of the tube from the area being heated is varied, there are correspondingly uneven temperatures in the area being heated by the system. This is especially true with low overhead mounted (7'-9') systems in high heat loss structures, such as greenhouses.

One attempt to more evenly distribute the thermal energy radiated by the metallic conduit is disclosed in U.S. Pat. No. 4,319,125 issued to Prince. Prince employs a dispersing reflector adjacent to the relatively hot initial portion of the metallic conduit and a parabolic or concentrating reflector adjacent to the colder end portion of the conduit to compensate for the varying intensity of thermal energy radiated over the length of the conduit. While the shaped reflector may provide some measure of improvement in the distribution of the thermal energy throughout the area serviced by the heater system, the opaque conduit and reflector obstruct sunlight entering the greenhouse and produce a shadow which adversely affects the growth of plants thereunder.

SUMMARY OF THE INVENTION

The present invention provides a radiant heating system of relatively simple and inexpensive construction which provides controlled and uniform heating of a greenhouse environment.

According to an important feature of the invention, the radiant heating system includes a tubular conduit which extends to an area to be heated and is formed from a length of gas impermeable plastic tubing. A burner connects to one end of the conduit so that the conduit receives the effluent output from the burner, thereby providing energy which radiates from the conduit. This arrangement provides an inexpensive radiator heating system which maintains a substantially even temperature throughout the length of the conduit.

According to a further feature of the invention, the tubular conduit is arranged overhead and formed from light transmitting material to allow the sunlight projecting into the greenhouse to pass through the conduit without substantially interfering with the transmision of light to the plants grown thereunder. This arrangement maintains a uniform light environment within the greenhouse for consistent plant growth. In the preferred embodiment, the tubing is formed from nylon reinforced polyethylene, or other suitable light transmitting material, so as to allow the use of a readily available inexpensive material for the conduit.

According to a further feature of the invention, the tubing is formed from nonrigid plastic material having a normally collapsed configuration and attains an inflated configuration by the action of the heated effluent transmitted through the tubing. This arrangement allows the tubing to normally assume a collapsed configuration, to facilitate shipping and storage, and yet allows the tubing to assume an inflated configuration in response to the passage of heated effluent therethrough.

According to a further feature of the invention, the system further includes a floor radiator formed of a length of substantially gas impermeable tubing, preferably of plastic although low emission sheet metal tubing may be used since sunlight is not a factor, communicating with the burner and disposed proximate the greenhouse floor and valve means operative to selectively direct the heated effluent from the burner to either the overhead radiator tubing or the floor radiator tubing. This arrangement allows the system to selectively provide radiant heat either to the upper regions of the greenhouse or to the floor regions of the greenhouse.

According to a further feature of the invention, the system further includes exhaust means, the free end of the overhead tubing is connected to the free end of the floor tubing, and the valve means is selectively operative to direct the heated effluent to the overhead tubing for subsequent movement through the floor tubing to the exhaust means or to direct the heated effluent to the floor tubing for subsequent movement through the overhead tubing to the exhaust means. This arrangement allows the heated effluent to be directed through an enclosed loop and allows selection of the direction of movement of the effluent through the loop to the exhaust.

Further, the exhaust means may direct the exhaust effluent either inside or outside of the enclosure depending on the configuration desired. For example, in a greenhouse system it is desirable to minimize heat loss and provide $CO_2$ for plants to use. As such, exhausting the effluent inside the structure aids in both factors. On the other hand, if the system were placed in a high human traffic area, the exhaust can be directed outside to minimize $CO_2$ buildup.

An additional related concern involves the placement of the inlet related to the source of heated air effluent for the system. To minimize humidity in the local environment, all or a portion of the ambient air may be ingested by the system. It is important in many applications to control the humidity and thus control the condensation within the structure. By placing the inlet and exhaust outlet either inside or outside the structure, humidity can be effectively controlled.

In the disclosed embodiment of the invention, the valve means is connected to the exhaust means and the burner, the valve means has an overhead outlet and a floor outlet, one end of the tubing of the overhead radiator is connected to the overhead outlet of the valve means, one end of the tubing of the floor radiator is connected to the floor outlet of the valve means, the valve means is configured to selectively direct the heated effluent from the burner to the overhead outlet or to the floor outlet and is further configured to allow the exhaust means to communicate with the outlet other than the outlet selected to receive the heated effluent from the burner. The system further includes connector means having an overhead port and a floor port with the overhead port of the connector means attached to the free end of the overhead radiant and the floor port of the connector means attached to the free end of the tubing of the floor radiator. This specific arrangement provides a simple and effective means for distributing the heated effluent initially through the overhead radiator for subsequent discharge through the floor radiator and exhaust means or to the floor radiator for subsequent discharge through the overhead radiator and the exhaust means.

According to a further feature of the invention, the effluent is heated to a temperature of approximate 200° F. so that the radiant output of the system corresponds to the absorptivity peak of the floor and surrounding equipment and structures which allows these components to reradiate the radiant energy. This arrangement optimizes the heat transfer efficiency of the system.

According to a further feature of the invention, the system includes a manifold communicating with the burner, the manifold has a plurality of upper manifold outlets and a plurality of lower manifold outlets, a corresponding plurality of tubular overhead radiators connect to the upper manifold outlets, a corresponding plurality of tubular lower radiators connect to the lower manifold outlets, and a plurality of connector members operate to connect one of the overhead radiators to a respective one of the floor radiators. This arrangement provides a plurality of closed loop systems which may be positioned within the enclosure to uniformly and effectively heat the enclosure.

According to a feature of the invention methodology, a source of heated air is provided, one end of a normally non-rigid, collapsed tube is connected to the source of heated air, the tube is positioned within an enclosure to be heated, and heated air is blown from the source through the tube to inflate the tube and provide radiant heat to the enclosure. This methodology provides a ready, efficient and inexpensive means of uniformly heating an enclosure.

According to a further feature of the invention methodology, the step of providing a source of heated air comprises providing a burner and a blower, and the blower operates to blow ambient air through the tube in excess of the amount of air required for complete combustion of the fuel used by the burner so as to regulate the overall temperature of the air blown through the tube. This methodology allows the system to use the non-rigid type tube operating at a temperature below the melting point of associated components.

BRIEF DESCRIPTION OF THE DRAWINGS

These and other objects and aspects of the invention will become apparent in the detailed description of the invention hereinafter with respect to the drawings in which.

DETAILED DESCRIPTION OF THE PREFERRED EMBODIMENT

The present invention provides for the heating of a greenhouse 10 in an easily assembled, substantially uniform, radiant heating system 12 of relatively simple and inexpensive construction. The heating system 12 is generally composed of a heat generating and distributing assembly 14 and a radiant heating assembly 16. Generally, the heat generating and distributing assembly 14 produces a heated air effluent which is projected through the radiant heating assembly 16 to the area to be heated.

Figure 1:
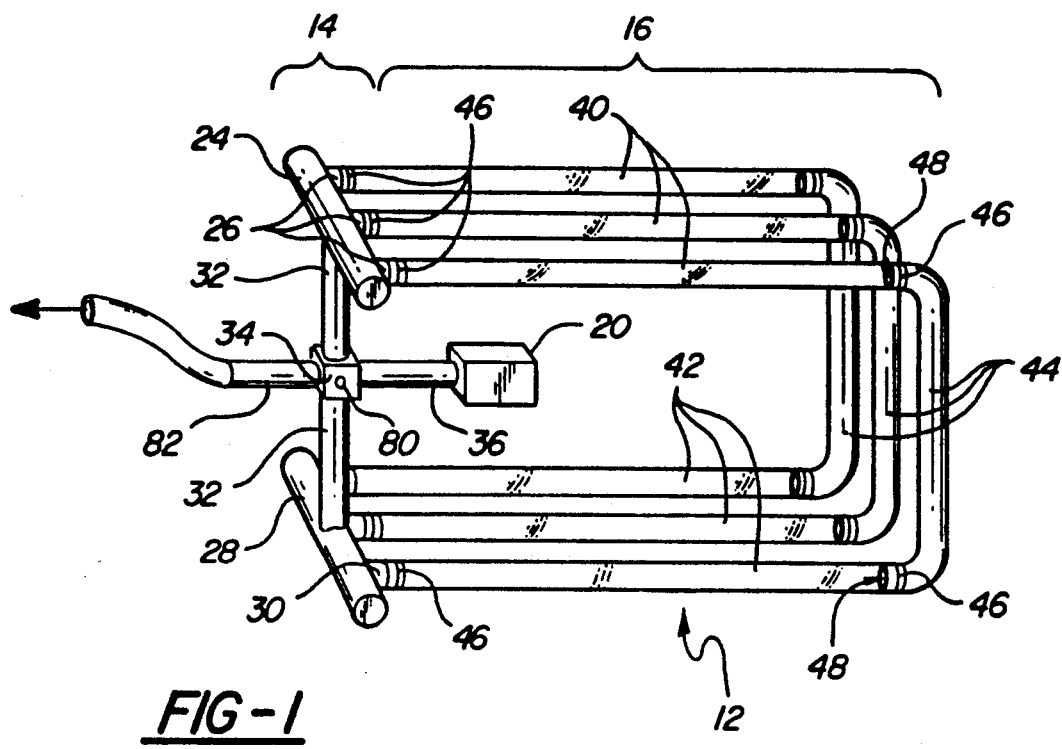
FIG. 1 is a perspective view of the invention heating system removed from any related enclosure.
Figure 2:
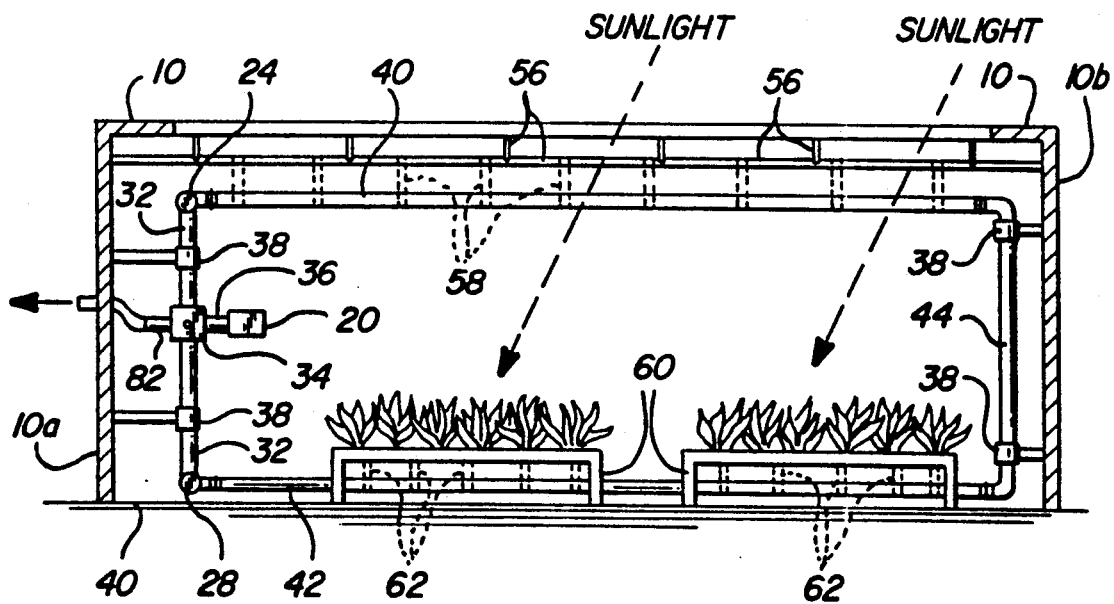
FIG. 2 is a side view of the invention heating system disposed in a greenhouse.

With reference to FIGS. 1 and 2, the heat generating and distributing assembly 14 includes a burner/blower unit 20 and a manifold assembly 22.

Burner/Blower unit 20 includes a blower 70 which operates to project a flow of air from inlet 72 past burner 74 and into connector duct 36. The output of the burner/blower unit 20 is distributed through a valve assembly 34 to a manifold assembly 22 which includes an upper, horizontally disposed, air duct arm 24 having a plurality of outlets 26 distributed along the length thereof; a lower horizontally disposed air duct arm 28 also having a plurality of outlets 30 distributed along the length thereof; a valve assembly 34; a vertically extending duct 32 connecting the valve assembly to upper and lower arms 24,28; a horizontally extending duct 36 connecting the valve assembly 24 to burner/blower unit 20; and an exhaust duct 82 connecting the valve assembly to the exhaust to the exterior of the greenhouse, through greenhouse end wall 10A. All of the components of the manifold assembly 22 are formed from a metallic material to provide structural strength to the overall system 12 and withstand any direct heat from the burner/blower unit 20.

Valve assembly 34 includes a substantially cubic housing 75 having an internal plate 76 pivoted about a horizontal axis 78 between a first position 76a and a second position 76b by operation of an external nob 80 mounted coaxially on the pivot axis 78. The exhaust duct 82 and connector duct 36 are connected to opposite side walls of the housing and vertical ducts 32 are connected to the top and bottom walls of the housing. The external nob 80 is preferably a motorized unit adapted to pivot internal plate 76 in a controlled manner without the need for physical manipulation.

The heat generating and distributing assembly 14 is disposed proximate end wall 10A of the greenhouse 10 by support arms 38 which engage vertical ducts 32 to position the lower air duct arm 28 and outlets 30 near the greenhouse floor 40. The dimensions of the manifold assembly 22 and, more specifically, the vertical ducts 32 are such that the upper air duct arm 24 and upper outlets 26 are correspondingly positioned at an elevated overhead position above the greenhouse floor 40.

The radiant heating assembly 16 includes a plurality of tubular overhead radiators 40, a corresponding plurality of lower tubular floor radiators 42, and a corresponding plurality of connector tubes 14. The connector tubes 44 are vertically oriented proximate the opposite wall 10B of the greenhouse 10 by additional support arms 38. Each connector tube 44 has an overhead port 48 and lower floor port 50. When the connector tubes 44 are attached to the opposite greenhouse wall the lower floor port 50 is positioned proximate the floor 40 and the upper port 48 is positioned at an elevated overhead position. Each overhead radiator 40 connects at one end to an upper outlet 26 by operation of a clamp 46 which secures the end of the radiator 40 against the outside of the outlet 26 inserted therein. The other end of each overhead radiator 40 attaches in like fashion to an upper connector port 48 using a clamp 46. Similarly, each lower tubular floor radiator 42 connects at one end to a lower outlet 30 of the manifold assembly 22 and at the other end to the floor port 50 of a connector tube 44. The radiant heating section 16 is thereby arranged as a sequence of closed loops formed by related overhead radiators 40, floor radiators 42 and connector tubes 44, which can be positioned in areas of the greenhouse to be heated. Typically, each closed loop of radiators 40,42 would be positioned to extend above and below a series of one or more tables 60 in the greenhouse 10.

Figure 5:
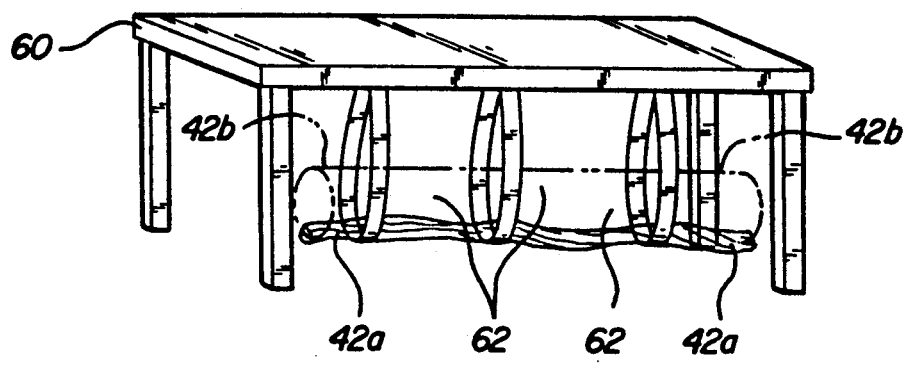
FIG. 5 is a detailed view of a section of a lower radiator used in the invention heating system.
Figure 4:
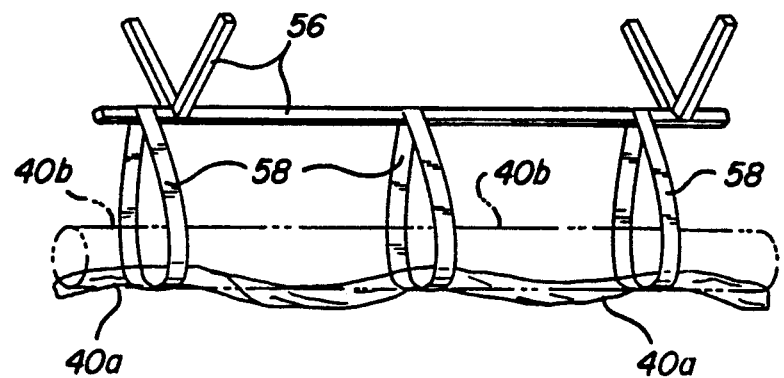
FIG. 4 is a detailed view of a section of an overhead radiator used in the invention heating system.

With reference also to FIGS. 4 and 5, each of the tubular radiators 40, 42, are configured as energy-emitting conduits formed from a length of non-rigid, polyethylene tubing having a diameter in the range of 8 to 20 inches to provide substantially gas impermeable plastic radiators 40,42. The non-rigid polyethylene tubing has a relatively thin wall thickness so as to have a substantially collapsed normal configuration 40A, 42A which attains an inflated configuration 40B, 42B, by action of the heated air effluent transmitted therethrough.

Further, the non-rigid, polyethylene tubing is substantially transparent so as to transmit light projected therethrough. The large diameter of the radiators 40,42 provides sufficient surface area directed toward the area to be heated so as not to require an opaque reflector. By this construction, the radiators 40 allow sunlight projecting through the greenhouse window areas to be substantially transmitted through the tubing so as not to interfere with the transmission of light to the plants grown thereunder.

The overhead radiators 40 are suspended from ceiling braces 56 of the greenhouse 10 by hanging flexible plastic bands 58 which support the tubing at intervals along the length of a given overhead radiator 40. The plastic bands 58 are supported by the braces 56 and provide a non-invasive support for the overhead radiator 40 to maintain the integrity of the gas impermeable tubing. Further, the bands 58 are also substantially transparent so that they do not block sunlight.

The lower radiators are similarly suspended below greenhouse tables 60 by hanging strips 62. The tables 60 support the plants in the greenhouse 10, and provide a convenient framework for mounting hanging strips 62 which position the lower radiators 42 in proximity to the plants grown thereon.

Figure 3:
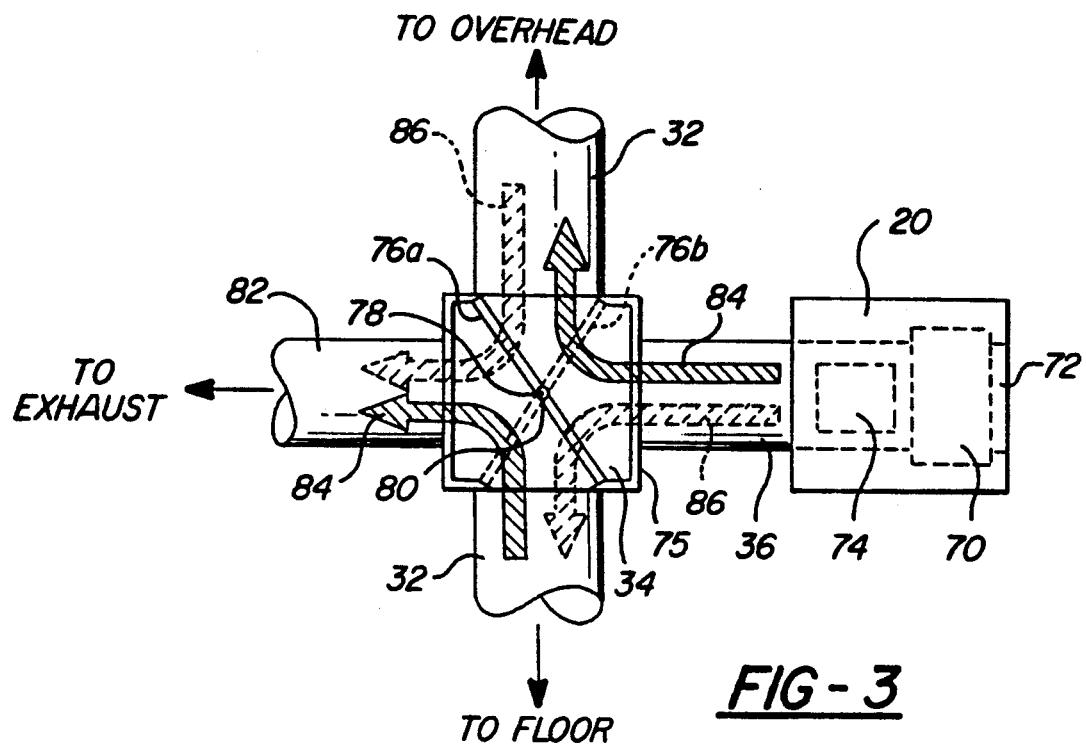
FIG. 3 is a side view of a valve means and blower assembly used in the invention heating system.

With reference also to FIG. 3, since the polyethylene has a low melting point, the burner/blower unit 20 operates to produce a low grade heated air effluent of a temperature below the melting point of the polyethylene. Blower 70 operates to project an amount of air approximately 500% in excess of the amount required for the combustion processes of the burner 74. While the burner 74 may produce output temperatures considerably higher than the melting point of the polyethylene, the overall heated air effluent produced by the burner/blower unit 20 has a temperature below the melting point of the polyethylene as a result of the combination of the burner output and the excess ambient-temperature air.

Preferably, the resulting heated air effluent temperature is approximately 200° F. For example, a propane burner output of 1000 Btu requires approximately 10 cubic feet of air for complete combustion, and an additional 50 cubic feet of ambient air (or 500% excess air) will cool the overall temperature of the resulting effluent to approximately 200° F. Several external factors will vary this relationship, including the type of fuel burned and the temperature of the ambient air. However, this approximate relationship remains.

When plate 76 is positioned in first position 76A a flow of effluent occurs from the blower 70 through the manifold assembly 22 to the overhead radiators 40, through the connector ducts 36 and lower radiators 42 back to the manifold assembly 22, and out the exhaust duct 82 (as shown by solid arrow 84). When the plate 76 occupies the second position 76B the path is substantially reversed and a flow of effluent occurs from the blower 70 through the manifold assembly 22 to the lower radiators 42, through the connector ducts 36 and overhead radiators 40 back to the manifold assembly 22, and out the exhaust duct 82 (as shown by the dashed arrows 86). This allows the operator of the greenhouse to choose the radiator 40, 42 which will receive heated air effluent first and therefore act as the primary radiant heat source (the overhead radiator 40 in position 76A, or the floor radiator 42 in position 76B). The greenhouse will further receive secondary, or residual, heating from the radiator 40, 42 which operates later in sequence.

Thus, the radiant heating system 12 provides for selective heating of the greenhouse 10. When the effluent is directed first to the lower floor radiators 42, the radiant heat is directed at the root zone of soil in containers placed on the tables 60. This type of heating is most appropriate for seedling operations where soil temperature is most critical. When the effluent is directed first to the overhead radiators 40, the radiant heat is directed at the plant canopy above the tables 60. This type of heating is most appropriate for more advanced plant growth where environment temperature is most critical.

The low grade 200° F. effluent temperature allows for primary radiator lengths of over 100 feet without substantial loss of effluent temperature over that length. Sufficient heat energy is radiated by a large volume of heated air effluent projected through the tubing and the large surface area of the polyethylene tubing. Further, since the effluent is heated to a temperature of approximately 200° F., the radiant output of the system further corresponds to the absorptivity peak of the floor and allows the floor to reradiate the radiant output of the lower radiators 42.

Preferably, the radiator tubing has a diameter greater than 8 inches, and within the range of 12 to 18 inches to closely match the outlet diameter on the typical burner manifold assembly and to provide sufficient surface area for heating the greenhouse with a convenient number of radiators 40 and 42. However, radiators of various diameters may be used to accommodate different heating configurations and specific heating needs. For example, in high heat loss situations, a large number of small diameter (approximately 4 inch) radiators may be disposed throughout a greenhouse to provide increased radiator surface area for heat transfer so as to more evenly distribute heat therein. Conversely, in low heat loss situations, fewer radiators of possibly larger diameter (up to 36 inches) may be utilized to maintain a minimum amount of radiator surface area for heat transfer. In either case, the apparatus is configured to allow for relatively complete radiant transfer of heat energy to the greenhouse such that the exhaust temperature of the effluent is within approximately 20 degrees or less of the ambient greenhouse temperature so as to be as thermally efficient as practical. Thus, the exact number, diameter, and lengths of the radiators depends upon the specific greenhouse parameters, such as heat loss, size, etc., for the given application.

Figure 6:
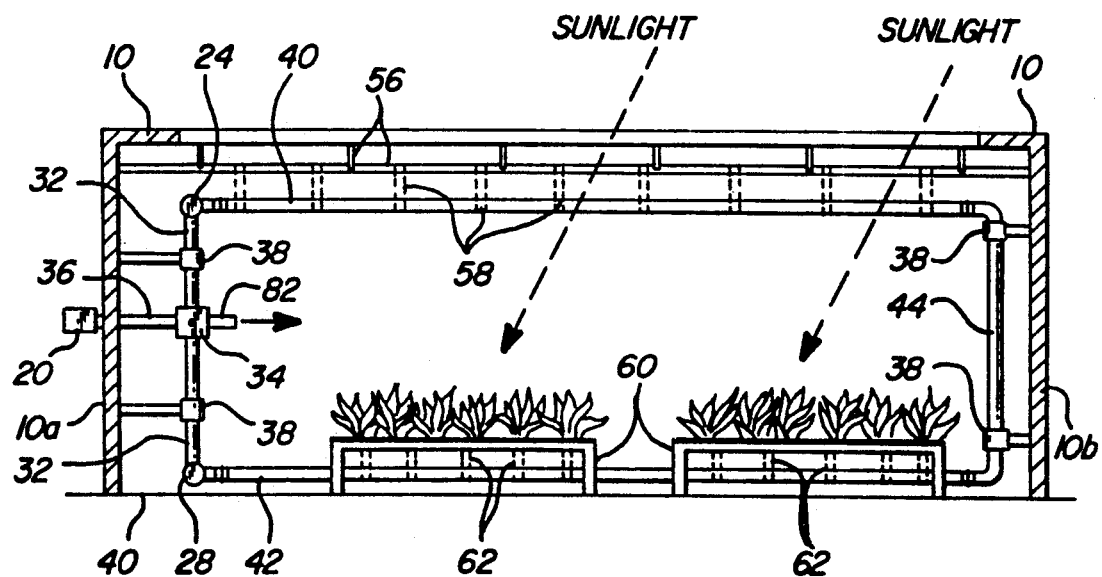
FIG. 6 is a side view of an alternate configuration of the invention heating system disposed in a greenhouse.

Further, the exhaust means may direct the exhaust effluent either inside or outside of the enclosure depending on the configuration desired. For example, in a greenhouse system it is desirable to minimize heat loss and provide $CO_2$ for plants to use. As such, exhausting the effluent inside the structure aids in both factors. On the other hand, if the system were placed in a high human traffic area, the exhaust can be directed outside to minimize $CO_2$ buildup. Thus, by way of example, in FIG. 2, the exhaust duct 82 terminates outside the enclosure 10 so as to exhaust effluent and products of combustion outside of the enclosure 10, while, in FIG. 6, an alternative construction disposes the end of exhaust duct 82 inside the enclosure 10 to minimize heat loss and provide $CO_2$ for plants to use.

An additional related concern involves the placement of the inlet related to the source of heated air effluent for the system. To minimize humidity in the local environment, all or a portion of the ambient air may be ingested by the system. It is important in many applications to control the humidity and thus control the condensation within the structure. By placing the inlet and exhaust outlet either inside or outside the structure, humidity can be effectively controlled. Thus, by way of example, the burner/blower unit 20 may be located inside the enclosure 10 (FIG. 2) or outside the enclosure 10 (FIG. 6) depending on the humidity needs of the structure. It should be noted, that the same function can occur by placing the inlet to the burner/blower unit 20 at a specific location without moving the entire burner/blower unit between the interior and exterior of the structure.

In further alternative embodiments, the greenhouse itself may be a temporary structure, such as a light transmissive tent adapted to be relocatably placed in various areas to protect outdoor plants from external elements, such as frost. In other applications, the enclosures heated with the present system may include other enclosures where the radiators may be exposed to the interior of the building, for example open-area warehouses, garages, or malls.

From the foregoing description of the preferred embodiment it can be seen that various alternative embodiments of the invention can be anticipated without departing from the scope of the invention as defined in the following claims.

I now claim:

1. A method of heating an enclosure comprising the steps of:
   providing a source of heated air;
   connecting one end of a non-rigid, normally collapsed tube to said source and positioning said tube within said enclosure; and
   blowing heated air from the source through the tube to inflate the tube and provide radiant heat to the enclosure.

2. The method of claim 1, wherein
   said non-rigid tube is formed of a tubular plastic material.

3. The method of claim 1, wherein
   said plastic material is polyethylene.

4. The method of claim 1, wherein
   said step of providing a source of heated air comprises providing air having a temperature below the melting point of the plastic material.

5. The method of claim 4, wherein
   said step of providing a source of heated air further includes the step of providing a burner and a blower; and
   said blower operates to blow ambient air through the tube in excess of the amount of air required for complete combustion of the fuel used by the burner so as regulate the temperature of the air blown through the tube.

6. A method of heating an enclosure utilizing a burner arranged to transmit a heated effluent through a radiator to heat an area of the enclosure in proximity to the radiator, characterized in that the radiator is provided as a length of collapsible tubing and the heated effluent is passed through the tubing to inflate the tubing and provide radiant heat to the enclosure.

7. A method according to claim 6 wherein the length of collapsible tubing is provided as a length of tubular plastic tubing.

8. A method according to claim 6 wherein the method includes maintaining the heated effluent passed through the tubing at a temperature below the melting point of the tubing.

9. A method according to claim 6 wherein a blower is provided and the method includes operating the blower in a manner to blow ambient air through the tubing in excess of the amount of air required for complete combustion of the fuel used by the burner so as to regulate the temperature of the air blown through the tubing.

10. A method according to claim 6 wherein the length of collapsible tubing is provided as a length of transparent tubing.

* * * * *